United States Patent
Wu et al.

(10) Patent No.: US 8,300,106 B1
(45) Date of Patent: Oct. 30, 2012

(54) IMAGE STABILIZER AND IMAGE CAPTURING DEVICE HAVING SAME

(75) Inventors: Ting-Yuan Wu, New Taipei (TW); Chi-Wei Chiu, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/214,258

(22) Filed: Aug. 22, 2011

(30) Foreign Application Priority Data

May 20, 2011 (TW) ................................ 00117876 A

(51) Int. Cl.
*H04N 5/228* (2006.01)
(52) U.S. Cl. ............. 348/208.99; 348/208.1; 348/208.2; 348/208.3; 348/208.4
(58) Field of Classification Search ............. 348/208.99, 348/208.1–208.7, 335, 340, 345
See application file for complete search history.

(56) References Cited

U.S. PATENT DOCUMENTS 7,783,179 B2 * 8/2010 Takahashi .................... 396/55
2011/0050922 A1 * 3/2011 Chiu ....................... 348/208.99

* cited by examiner

*Primary Examiner* — Yogesh Aggarwal
(74) *Attorney, Agent, or Firm* — Altis Law Group, Inc.

(57) ABSTRACT

An image stabilizer includes a stationary frame with four sidewalls, a moveable frame including four side panels, magnets, a plurality of fine pattern coils, and a resilient plate holding the moveable frame in the stationary frame. Each sidewall includes a receiving hole, a support portion received in the receiving hole, and a raised engagement portion extending from the support portion. The magnets are fixed on the side panels. The fine pattern coils are fixed in the receiving holes and aligned with the magnets and compensate for vibration and movement of the device to which it is affixed. The resilient plate is configured for returning the moveable frame to a resting position when a power supply is cut off.

9 Claims, 3 Drawing Sheets

IMAGE STABILIZER AND IMAGE CAPTURING DEVICE HAVING SAME

BACKGROUND

1. Technical Field

The present disclosure relates to imaging technologies and, particularly, to an image stabilizer and an image capturing device using the image stabilizer.

2. Description of Related Art

An image stabilizer generally includes a moveable frame and a copper coil wrapped around the moveable frame. The copper coil is formed by wrapping copper wires around the moveable frame. However, the copper wire is usually fine gauge and very delicate, and is easily torn during assembly. As a result, a lot of wire is wasted, at a cost of time and money.

Therefore, it is desirable to provide an image stabilizer and an image capturing device having the image stabilizer, which can overcome or alleviate the above-mentioned problems.

DETAILED DESCRIPTION

Figure 1:
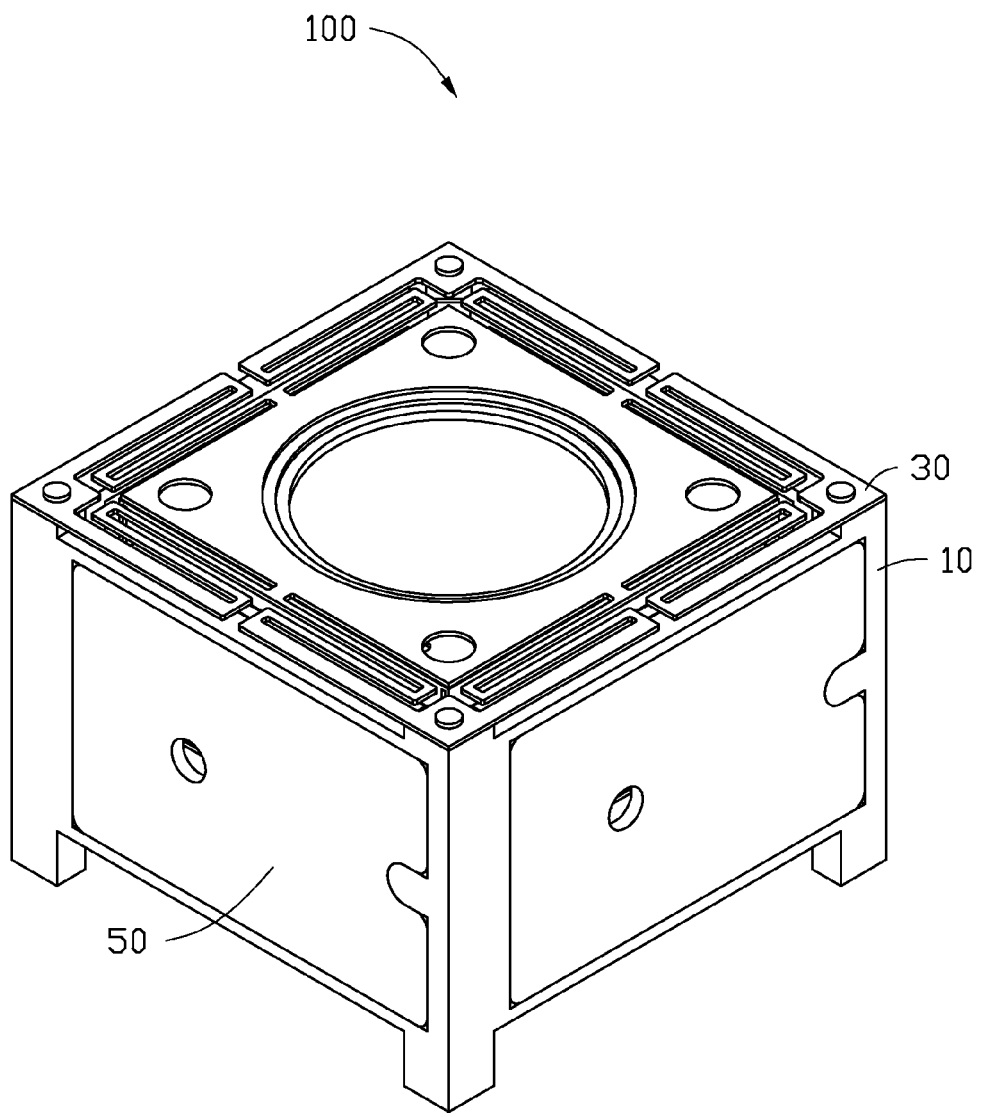
FIG. 1 is a schematic, isometric view of an image stabilizer, according to a first exemplary embodiment.
Figure 2:
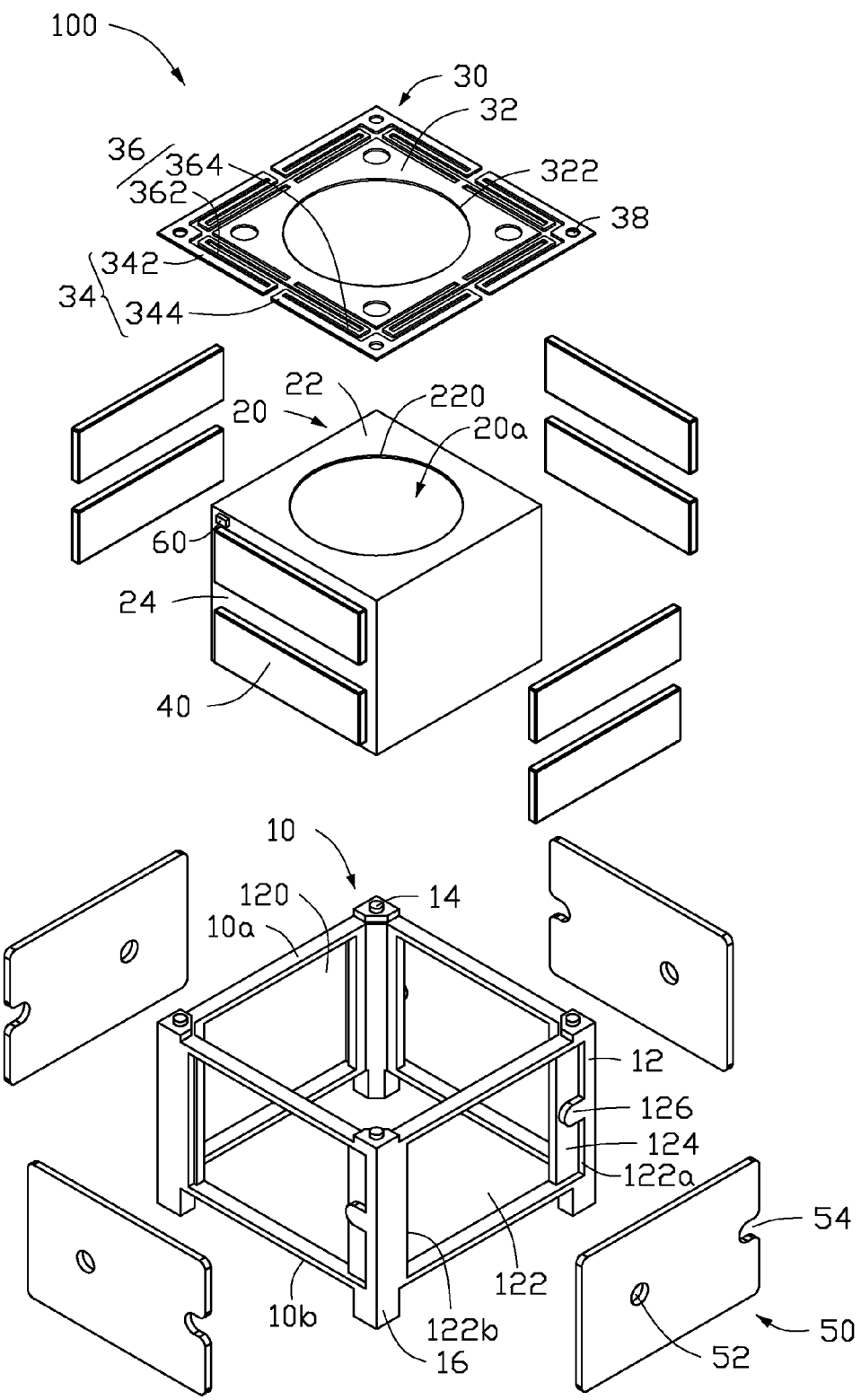
FIG. 2 is an exploded view of the image stabilizer of FIG. 1.

Referring to FIGS. 1-2, an image stabilizer 100, according to a first exemplary embodiment, includes a stationary frame 10, a moveable frame 20, a resilient plate 30, eight magnets 40, four fine pattern coils 50, and a gyroscope 60.

The stationary frame 10 may be fixed to an electronic device, such as a digital camera (not shown). The stationary frame 10 is substantially cuboid with a central axis. The stationary frame 10 includes four sidewalls 12, four engagement posts 14, and four support posts 16.

The four sidewalls 12 perpendicularly connect each other end-to-end to form a first receiving room 120. Each sidewall 12 defines a receiving hole 122 and includes a support portion 124 and a raised engagement portion 126. The four receiving holes 122 are in communication with the first receiving room 120. The support portion 124 is received in the corresponding receiving hole 122 and perpendicularly extends from a first wall 122a of the receiving hole 122 toward an opposing second wall 122b. The first wall 122a is parallel to the second wall 122b. In this embodiment, the support portion 124 does not contact the second wall 122b, and the cross-sectional area of the receiving hole 122 is several times greater than the surface area of the support portion 124. The engagement portion 126 extends from the corresponding support portion 124 and partially covers it.

The stationary frame 10 includes a top surface 10a and a bottom surface 10b. The four engagement posts 14 protrude from the top surface 10a and each of the four corners of the top surface 10a has one engagement post 14. The four support posts 16 respectively extend from the four corners of the bottom surface 10b.

The moveable frame 20 is substantially cuboid and defines a central axis coinciding with the central axis of the stationary frame 10. The moveable frame 20 is received in the first receiving room 120 and kept apart from the stationary frame 10. The moveable frame 20 includes a top panel 22 and four side panels 24 perpendicularly extending from four sides of the side panels 24. The top panel 22 and the four side panels 24 cooperatively define a second receiving room 20a for accommodating a lens module 200 (shown in FIG. 3). The top panel 22 defines a light incident hole 220.

The resilient plate 30 is square and includes a moveable portion 32, four stationary portions 34, four deformable strips (deformable portions 36), and four locating holes 38 positioned at the four corners of the resilient plate 30. The four locating holes 38 correspond to the four engagement portions 14.

The shape of the moveable portion 32 is substantially the same as that of the top panel 22. The moveable portion 32 defines a through hole 322 having a diameter which is slightly greater than that of the light incident hole 220. The through hole 322 aligns with the light incident hole 220. The moveable portion 32 is attached to the top panel 22 and moves with the moveable frame 20.

The four stationary portions 34 are the four edges of the resilient plate 30. The four engagement posts 14 extend through the respective locating holes 38 and are attached to the top surface 10a of the stationary frame 10 with adhesive. Each stationary portion 34 includes a first stationary plate 342 and a second stationary plate 344 separating from the first stationary plate 342. The first stationary plate 342 is symmetrical to the second stationary plate 344 with respect to a perpendicular centerline of the resilient plate 30.

The four deformable portions 36 are positioned in a space between the stationary frame 10 and the moveable frame 20. The four deformable portions 36 are crushed and deformable in that space. Each deformable portion 36 includes a first deformable plate 362 and a second deformable plate 364, there is the same symmetry between the first deformable plate 362 and the second deformable plate 364 as there is between the first stationary plate 342 and the second stationary plate 344. The outer ends of the two deformable plates 362 and 364 are curved. One end of the first deformable plate 362 is connected to the first stationary plate 342, and the other end of the first deformable plate 362 is connected to a side of the moveable portion 32. One end of the second deformable plate 364 is connected to the second stationary plate 344, and the other end of the second deformable plate 364 is connected to a side of the moveable portion 32.

The eight magnets 40 are divided into four groups. A pair of magnets 40 is spaced out on and attached to each side panel 24 with adhesive.

Each fine pattern coil 50 is flat and has thin coils in the form of printed circuit board manufactured with copper plating technology which can create thick and fine pitch copper line design. Each fine pattern coil 50 includes an insulating material layer and a plurality of copper wiring patterns embedded in the insulated material layer. Generally, a fine pattern coil 50 consists of 1 to 6 copper wiring pattern layers each made of copper wires. The thickness of each copper pattern layer is in a range from 30 to 200 micrometers. In the same copper pattern layer, the gap between neighboring copper wires is approximately 5 micrometers, the diameter of the copper wire is about 25 micrometers, and the pitch of neighboring copper wires is about 30 micrometers.

In this embodiment, each fine pattern coil 50 defines a central hole 52 and an engagement hole 54 apart from the central hole 52. The pattern of each fine pattern coil 50 is symmetrical and centered on the central hole 52. The engagement hole 54 corresponds to the engagement portion 126 and engages with it. Each fine pattern coil 50 is attached to the corresponding support portion 124 and is fixed in the corresponding receiving hole 122 with adhesive. Each fine pattern coil 50 aligns with two magnets 40 attached on the side panel 24. In assembly of the image stabilizer 100, the fine pattern coils 50 are directly mounted on the sidewalls 12 of the stationary frame 10, eliminating the need to wrap copper wires around the moveable frame 20, therefore time and copper wires and other material(s) are saved.

The gyroscope 60 is assembled to the side panel 24 and is configured for detecting vibration or movement of the moveable frame 20 when the electronic device experiences vibration or movement.

When a current is applied to the fine pattern coils 50, the fine pattern coils 50 are excited to act upon the magnets 40, thereby producing a magnetic force to drive the moveable frame 20 with the lens module 200 to move to or to remain in a predetermined position, to compensate for the vibration or movement of the moveable frame 20. When the current is cut off, the resilient plate 30 releases the tension caused by deformation, thereby returning the lens module 200 to its original position.

Figure 3:
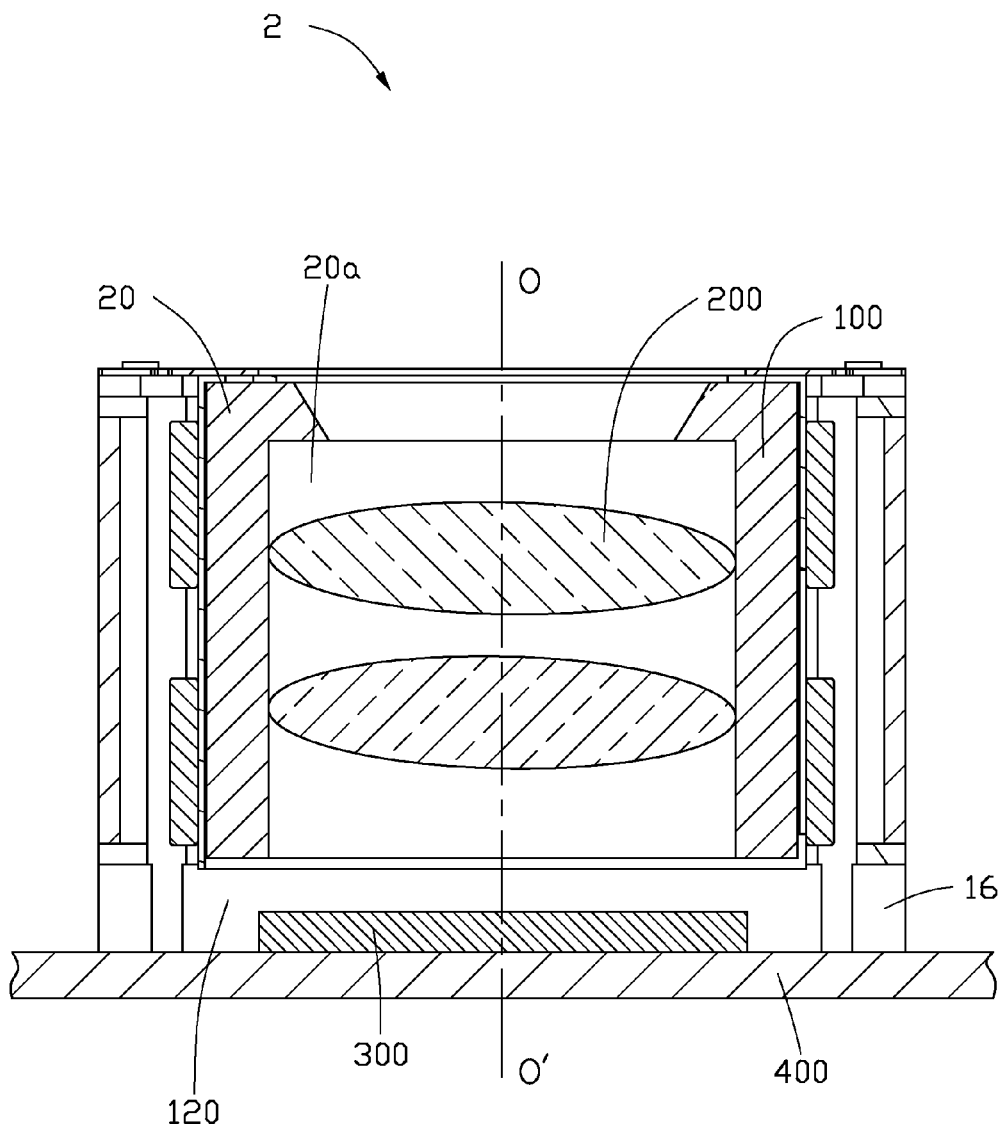
FIG. 3 is a cross-sectional view of an image capturing device, according to a second exemplary embodiment.

Referring to FIG. 3, an image capturing device 2, according to a second exemplary embodiment, is shown. The image capturing device 2 includes the image stabilizer 100, a lens module 200, an image sensor 300, and a base 400. The lens module 200 is received in the second receiving room 20a of the moveable frame 20. The base 400 is fixed on the stationary frame 10 adjacent to the bottom surface 10b, that is to say the support posts 16 are supported by the base 400. The image sensor 300 is received in the first receiving room 120 and fixed on the base 400. An optical axis OO' of the lens module 200 is aligned with the center of the image sensor 300 and coincides with the central axis of the stationary frame 10 and the moveable frame 20.

The advantages of the image capturing device 2 of the second embodiment are similar to those of the image stabilizer 100 of the first embodiment.

Even though numerous characteristics and advantages of the present embodiments have been set fourth in the foregoing description, together with details of the structures and functions of the embodiments, the disclosure is illustrative only, and changes may be made in details, especially in matters of shape, size, and the arrangement of parts within the principles of the disclosure to the full extent indicated by the broad general meaning of the terms in which the appended claims are expressed.

What is claimed is:

1. An image stabilizer comprising:
    a stationary frame comprising four sidewalls, each sidewall comprising a receiving hole, a support portion received in the receiving hole, and a raised engagement portion extending from the support portion;
    a moveable frame received in the stationary frame and apart from the stationary frame, the moveable frame comprising four side panels;
    a plurality of magnets fixed on the corresponding side panels;
    a plurality of fine pattern coils fixed in the receiving holes and aligned with the corresponding magnets, each fine pattern coil defining an engagement hole, the engagement portion engaging in the corresponding engagement hole, the fine pattern coil attached to the corresponding support portion; and
    a resilient plate interconnecting the stationary frame and the moveable frame to hold the moveable frame in the stationary frame.

2. The image stabilizer as claimed in claim 1, wherein two magnets are attached on each side panel with adhesive and are spaced apart from each other.

3. The image stabilizer as claimed in claim 2, wherein the fine pattern coils are fixed in the respective receiving holes with adhesive.

4. The image stabilizer as claimed in claim 3, wherein the resilient plate comprises four stationary portions, a moveable portion, and four deformable portions connected between the stationary portion and the moveable portion respectively, the moveable portion fixed on the moveable frame.

5. The image stabilizer as claimed in claim 4, further comprising a gyroscope, wherein the gyroscope is attached to one of the side panels and is configured for detecting movement of the moveable frame.

6. An image capturing device comprising:
    an image stabilizer comprising:
        a stationary frame comprising four sidewall, each sidewall comprising a receiving hole, a support portion received in the receiving hole, and a raised engagement portion extending from the support portion;
        a moveable frame received in the stationary frame and apart from the stationary frame, the moveable frame comprising four side panels;
        a plurality of magnets respectively fixed on the corresponding side panels;
    a plurality of fine pattern coils fixed in the receiving holes and aligned with the corresponding magnets, each fine pattern coil defining an engagement hole, the engagement portion engaging in the engagement hole, the fine pattern coil attached to the corresponding support portion; and
    a resilient plate interconnecting the stationary frame and the moveable frame to hold the moveable frame in the stationary frame;
    a lens module received in the moveable frame;
    a base fixed on the stationary frame opposite to the resilient plate;
    an image sensor received in the stationary frame and fixed on the base, an optical axis of the lens module is aligned with a center of the image sensor.

7. The image capturing device as claimed in claim 6, wherein two magnets are attached on one of the side panels with adhesive and are spaced apart from each other.

8. The image capturing device as claimed in claim 7, wherein the fine pattern coils are fixed in the respective receiving holes with adhesive.

9. The image capturing device as claimed in claim 8, wherein the resilient plate comprises four stationary portions, a moveable portion, and four deformable portions connected between the stationary portion and the moveable portion respectively, the moveable portion fixed on the moveable frame.

* * * * *